US012729836B2

(12) United States Patent
Yang

(10) Patent No.: US 12,729,836 B2
(45) Date of Patent: Sep. 8, 2026

(54) COLORFULLY DAZZLING FAN LAMP

(71) Applicant: Zhifa Yang, Huaihua (CN)

(72) Inventor: Zhifa Yang, Huaihua (CN)

( * ) Notice: Subject to any disclaimer, the term of this patent is extended or adjusted under 35 U.S.C. 154(b) by 0 days.

(21) Appl. No.: 19/314,303

(22) Filed: Aug. 29, 2025

(65) Prior Publication Data

US 2025/0389410 A1 Dec. 25, 2025

(30) Foreign Application Priority Data

Mar. 11, 2025 (CN) ......................... 202520428071.5

(51) Int. Cl.
*F21V 17/06* (2006.01)
*F21V 33/00* (2006.01)

(52) U.S. Cl.
CPC .......... *F21V 17/06* (2013.01); *F21V 33/0096* (2013.01)

(58) Field of Classification Search
CPC ............................. F21V 17/06; F21V 33/0096
See application file for complete search history.

(56) References Cited

U.S. PATENT DOCUMENTS 5,797,721 A * 8/1998 Yu .......................... F21V 15/04 362/147
12,297,997 B1 * 5/2025 Yu .......................... F21S 8/063
12,429,214 B1 * 9/2025 Zheng ..................... F21V 21/28
2015/0276207 A1 * 10/2015 Liu ..................... F21V 33/0096 416/5
2025/0237377 A1 * 7/2025 Wang ...................... F21V 33/00

FOREIGN PATENT DOCUMENTS

CN 109340196 A * 2/2019 .............. F21V 15/02
CN 115013786 B * 3/2024 .............. F21V 21/00
CN 119594368 A * 3/2025 ............ F21V 29/503
WO WO-2022016961 A1 * 1/2022 .............. F21V 33/00

* cited by examiner

*Primary Examiner* — Zheng Song

(74) *Attorney, Agent, or Firm* — Law Offices of Sandy Lipkin; Sandy Lipkin

(57) ABSTRACT

The present disclosure provides a colorfully dazzling fan lamp, including a main body frame, a fan assembly connected to the main body frame, and a light-emitting assembly arranged on the main body frame, where a bottom of the main body frame is provided with a connecting component, a stage lamp located below the fan assembly is connected to the connecting component, and the connecting component is provided with a connecting base for assembling the stage lamp. In this way, the stage lamp creates a dazzling and colorful lighting effect, and can be used for home decoration, party scenes, and the like, greatly enhancing the fun and entertainment value of the lighting and meeting the diverse needs of a user.

9 Claims, 9 Drawing Sheets

COLORFULLY DAZZLING FAN LAMP

CROSS-REFERENCE TO RELATED APPLICATION

This application claims priority to Chinese Patent Application No. 2025204280715 filed on Mar. 11, 2025, which is incorporated by reference in its entirety.

TECHNICAL FIELD

The present disclosure relates to the technical field of fan lamps, and in particular, to a colorfully dazzling fan lamp.

BACKGROUND

Conventional fan lamps have relatively limited functionality, typically offering only basic lighting and air circulation features with simplistic lighting effects, and fail to meet the demands of users for diversified and entertaining home products. In some leisure and entertainment venues or scenes of personalized home environments, there is a lack of fan lamp products capable of creating rich lighting atmospheres while combining the practicality and the entertainment value. For existing fan lamps, in terms of the structural design, the connection methods between the components and the wiring layout are not reasonable enough, resulting in complicated installation and inconvenient maintenance.

SUMMARY

In view of this, the object of the present disclosure is to provide a colorfully dazzling fan lamp capable of enhancing lighting effects and improving the entertainment experience of a user.

In order to solve the technical problems, the present disclosure uses the technical solution as follows.

A colorfully dazzling fan lamp includes a main body frame, a fan assembly connected to the main body frame, and a light-emitting assembly arranged on the main body frame, where a bottom of the main body frame is provided with a connecting component, a stage lamp located below the fan assembly is connected to the connecting component, and the connecting component is provided with a connecting base for assembling the stage lamp.

In a preferred solution of the present disclosure, the main body frame includes a ceiling base, a connecting rod, and a lamp holder arranged in sequence from top to bottom, the connecting component is provided with a first lead groove in communication with the outside, the connecting base is provided with a first through hole in communication with the first lead groove, the connecting rod is provided with a second lead groove, the ceiling base is provided with a second through hole enabling the second lead groove to be in communication with the ceiling base, an end, close to the lamp holder, of the connecting rod is provided with a third through hole enabling the second lead groove to be in communication with the outside, and a controller capable of controlling the stage lamp, the light-emitting assembly, and the fan assembly to operate is arranged in the ceiling base.

In a preferred solution of the present disclosure, the connecting component includes a number of L-shaped rods connected to the connecting base, a number of round rods connected to the L-shaped rods and connecting and fixing the number of L-shaped rods, and a number of fixing plates arranged on the round rods, with the other ends fixed to an upper end of the lamp holder.

In a preferred solution of the present disclosure, the L-shaped rod is internally hollow to form the first lead groove, and an end, away from the first through hole, of the first lead groove is located below the third through hole.

In a preferred solution of the present disclosure, the connecting component includes a cover plate detachably arranged on the lamp holder, and the cover plate is provided with a number of ventilation holes.

In a preferred solution of the present disclosure, the first lead groove is formed in the cover plate, the first lead groove extends from an inside of the cover plate to an outside of the cover plate, and an end, away from the first through hole, of the first lead groove is located below the third through hole.

In a preferred solution of the present disclosure, the stage lamp includes a housing arranged on the connecting base, a lampshade covering the housing, a driving motor arranged in the housing, a lamp plate arranged on the driving motor, and a number of lamp beads arranged on the lamp plate.

In a preferred solution of the present disclosure, the connecting base includes a mounting groove detachably connected to the housing.

In a preferred solution of the present disclosure, the housing is provided with a fourth through hole in communication with the first through hole.

In a preferred solution of the present disclosure, the lamp holder is provided with a lamp groove, a fifth through hole in communication with the second lead groove is formed in the lamp groove, and the light-emitting assembly includes a lamp strip arranged in the lamp groove and a light-transmitting component covering the lamp groove.

The present disclosure has the beneficial effects: The stage lamp creates a dazzling and colorful lighting effect, and can be used for home decoration, party scenes, and the like, greatly enhancing the fun and entertainment value of the lighting and meeting the diverse needs of a user.

All the components are in modular design, with the wiring layout reasonable, and a power line and a data line can be connected to the controller in the ceiling base through the first lead groove and the second lead groove, so that wiring is neat and orderly, thereby facilitating troubleshooting and maintenance of line faults.

DETAILED DESCRIPTION

Figure 1:
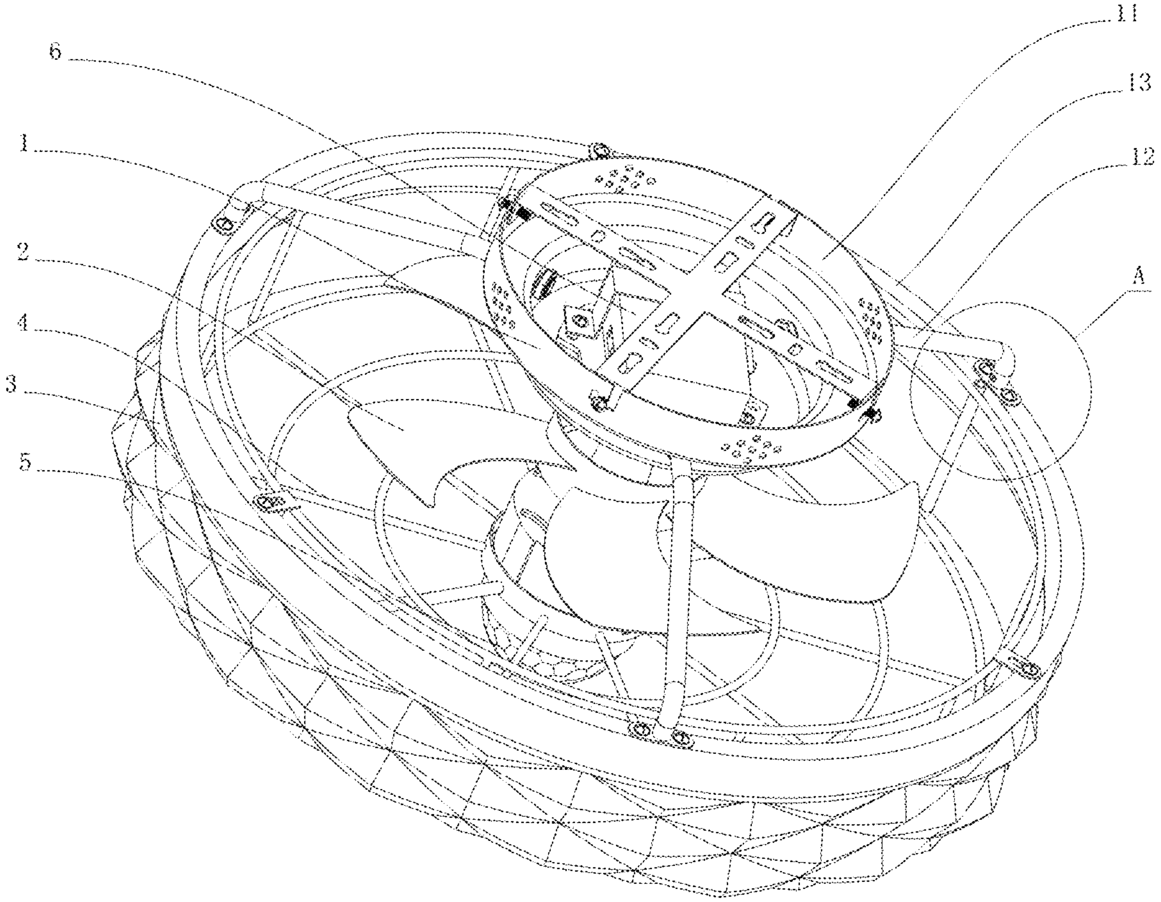
FIG. 1 is a schematic view of the present disclosure.
Figure 2:
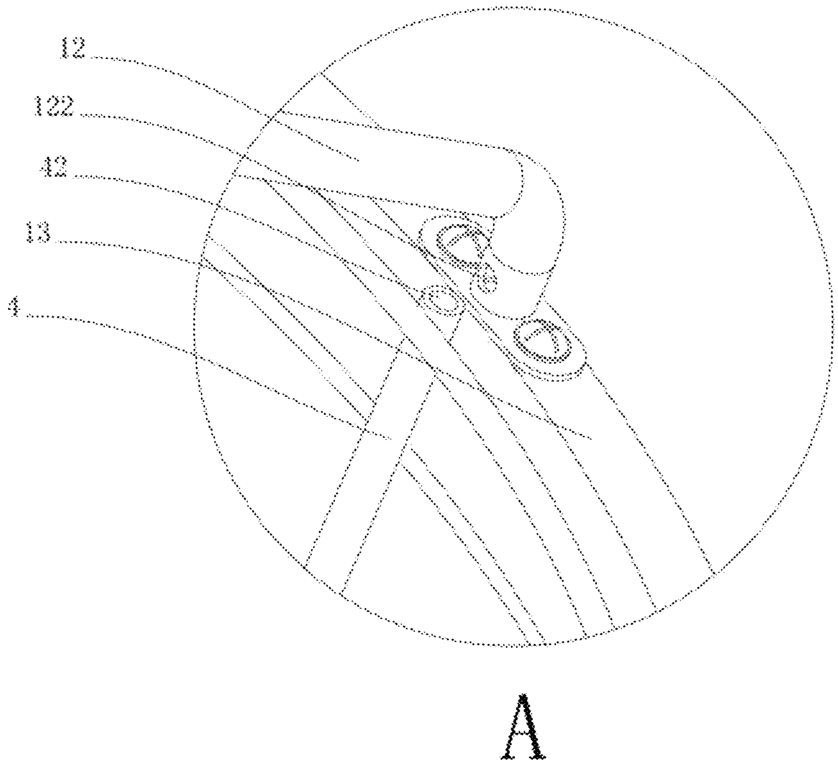
FIG. 2 is an enlarged view A of FIG. 1 in the present disclosure.
Figure 3:
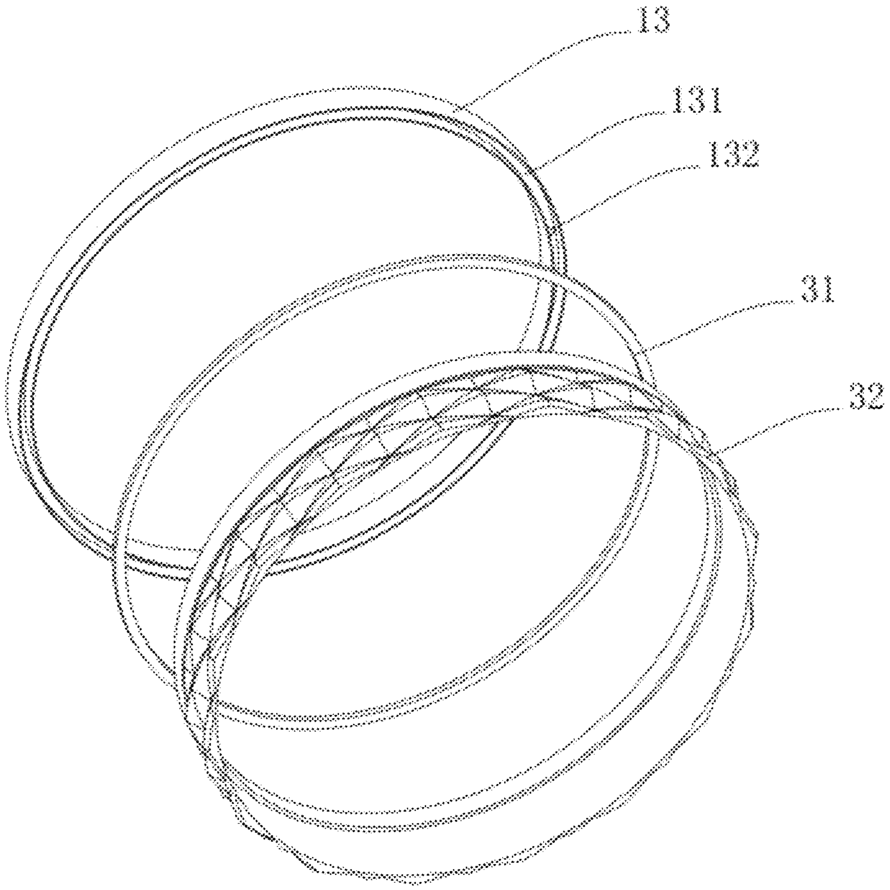
FIG. 3 is a schematic view of assembly of a light-emitting assembly and a lamp holder in the present disclosure.
Figure 4:
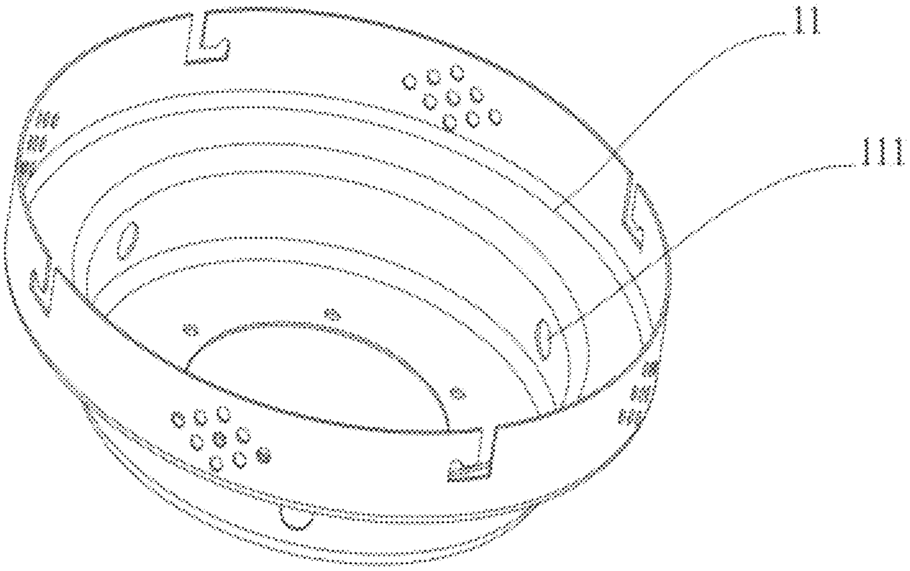
FIG. 4 is a schematic view of a ceiling base in the present disclosure.
Figure 5:
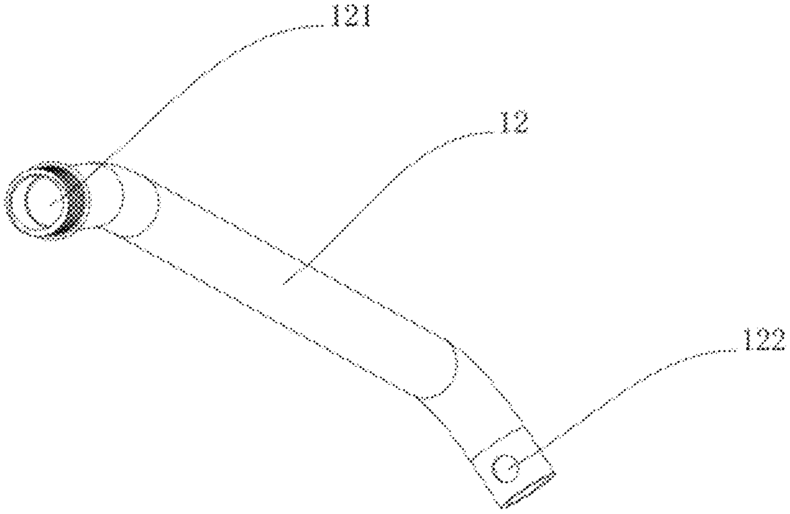
FIG. 5 is a schematic view of a connecting rod in the present disclosure.
Figure 6:
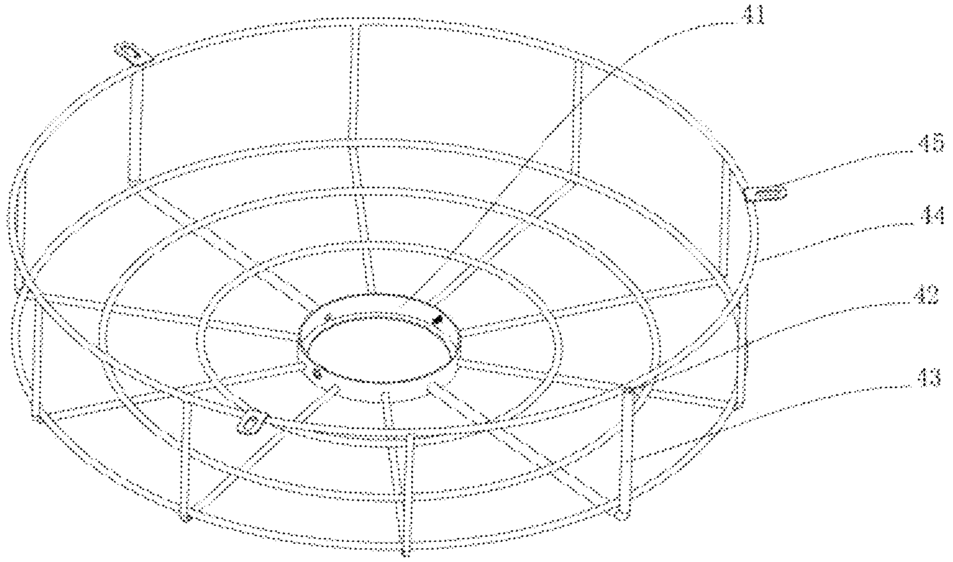
FIG. 6 is a schematic view of a connecting bracket in the present disclosure.
Figure 7:
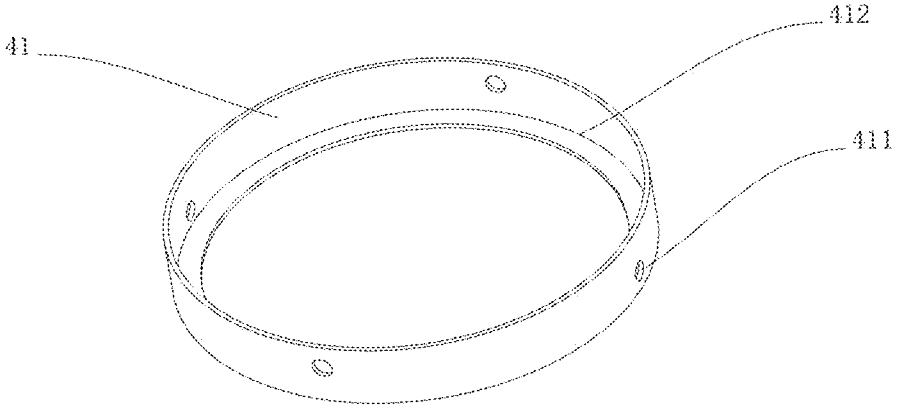
FIG. 7 is a schematic view of a connecting base in the present disclosure.
Figure 8:
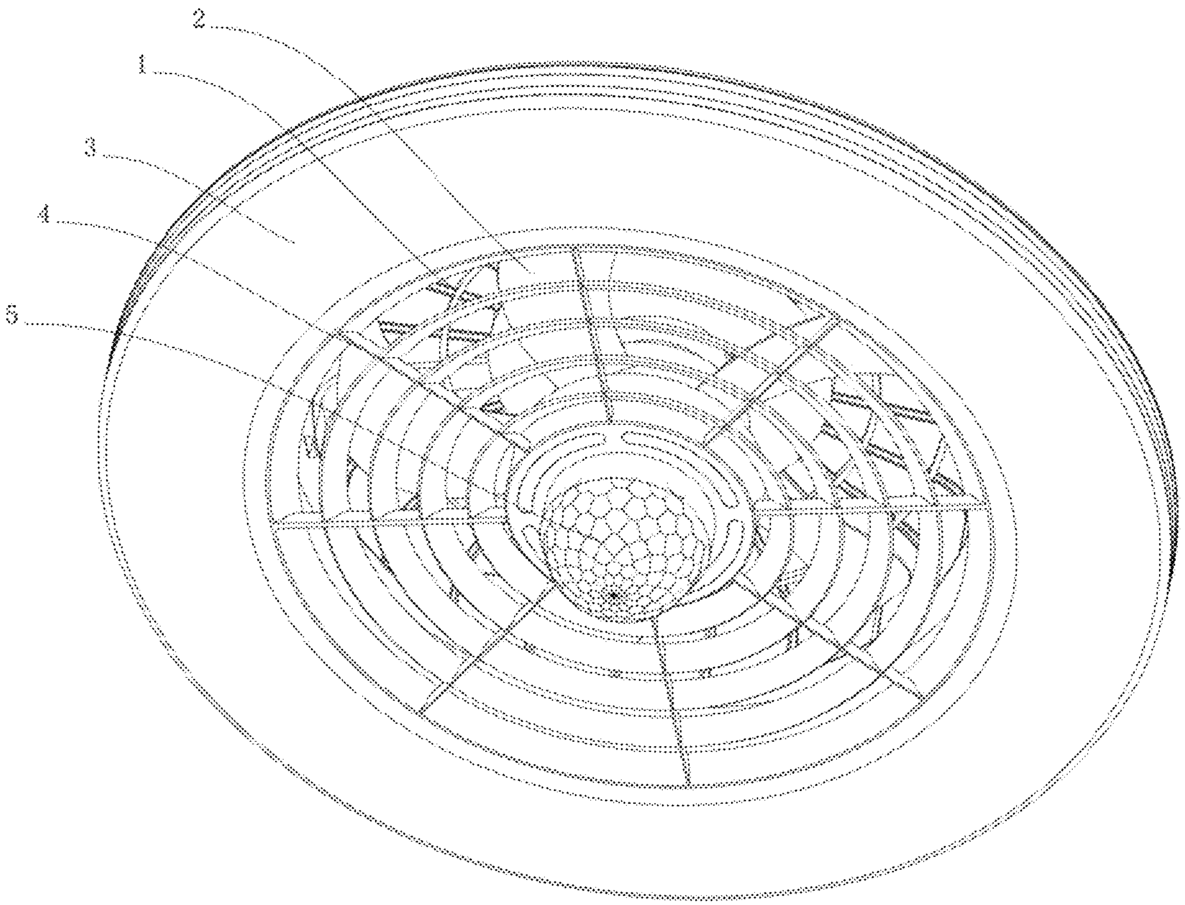
FIG. 8 is a schematic view of an embodiment when a connecting component is a cover plate in the present disclosure.
Figure 9:
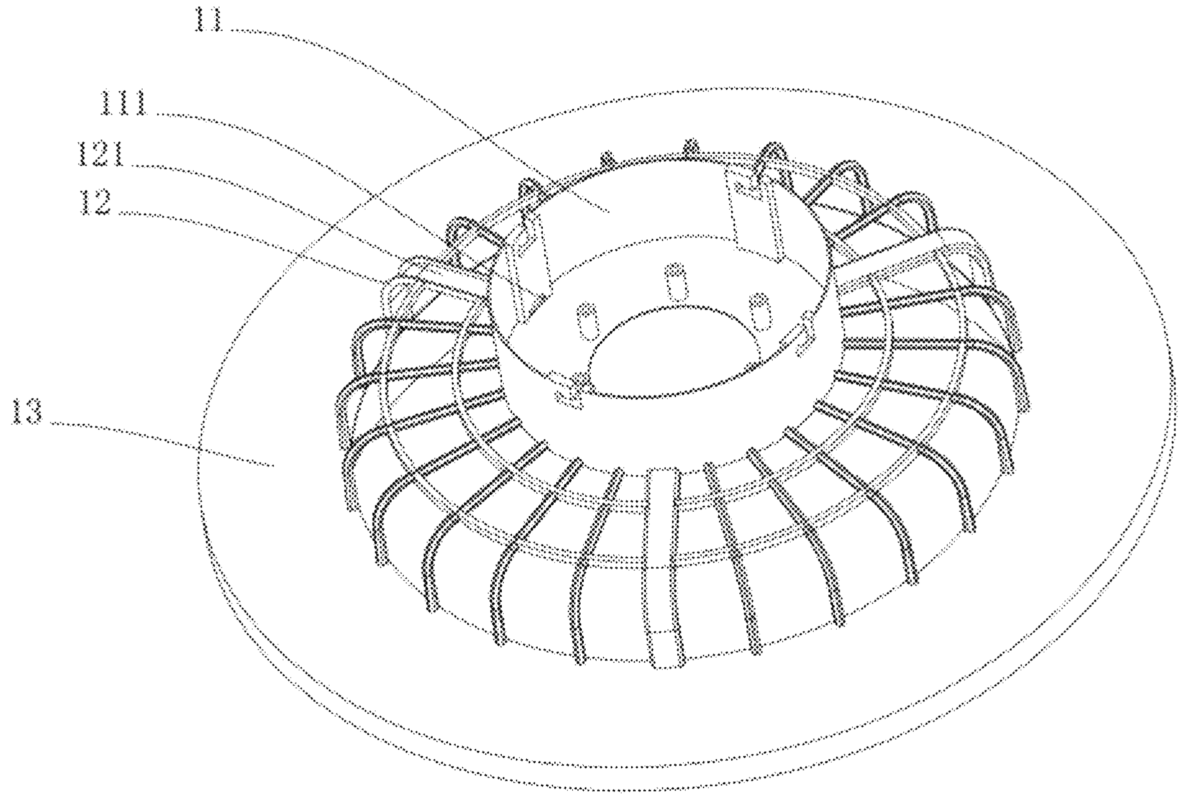
FIG. 9 is a first schematic view of a main body frame of the embodiment when the connecting component is the cover plate in the present disclosure.
Figure 10:
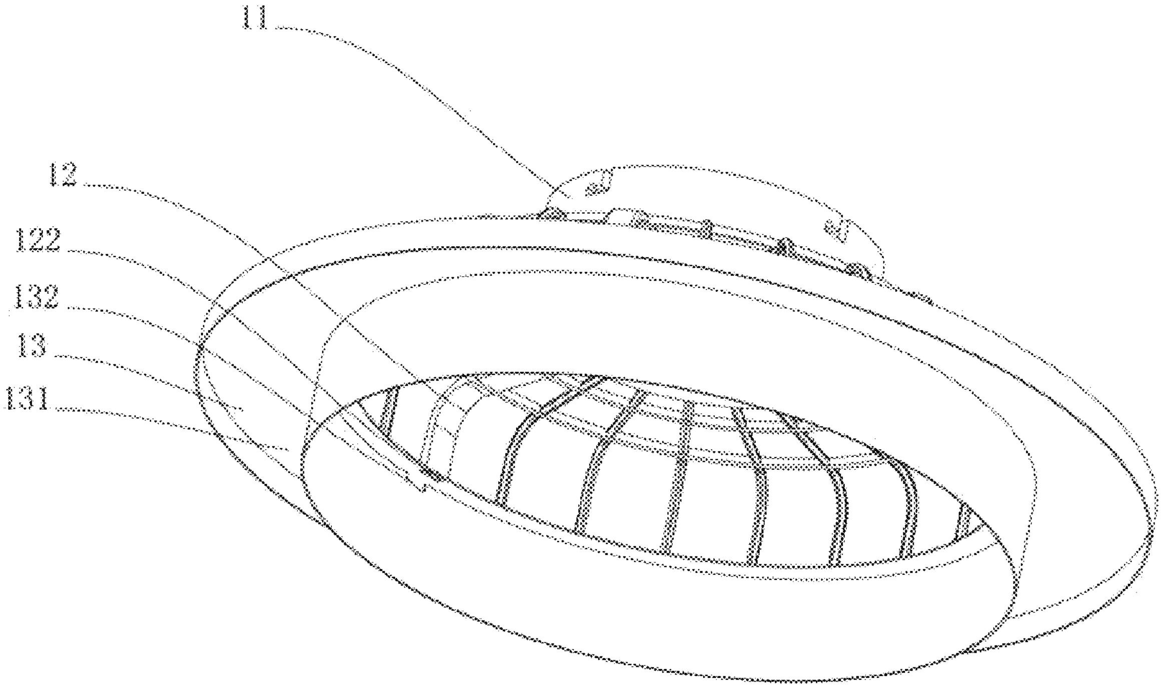
FIG. 10 is a second schematic view of the main body frame of the embodiment when the connecting component is the cover plate in the present disclosure.
Figure 11:
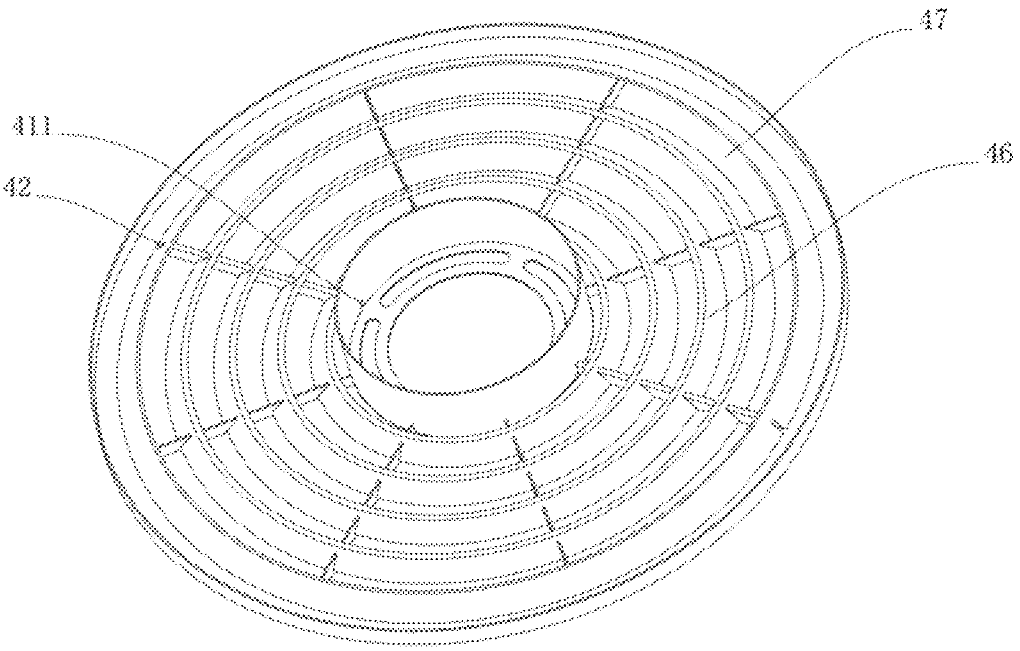
FIG. 11 is a schematic view of the cover plate in the present disclosure.

The technical solutions in the embodiments of the present disclosure will be clearly and completely described below in conjunction with the accompanying drawings.

With reference to FIG. 1 to FIG. 12, a colorfully dazzling fan lamp includes a main body frame 1, a fan assembly 2 connected to the main body frame 1, and a light-emitting assembly 3 arranged on the main body frame 1, where a bottom of the main body frame 1 is provided with a connecting component 4, a stage lamp 5 located below the fan assembly 2 is connected to the connecting component 4, and the connecting component 4 is provided with a connecting base 41 for assembling the stage lamp 5. In this way, the stage lamp 5 creates a dazzling and colorful lighting effect, and can be used for home decoration, party scenes, and the like, greatly enhancing the fun and entertainment value of the lighting and meeting the diverse needs of a user. For example, at family gatherings, the colorfully dazzling lighting effects can create a joyful and lively atmosphere.

In the solution, the main body frame 1 includes a ceiling base 11, a connecting rod 12, and a lamp holder 13 arranged in sequence from top to bottom, the connecting component 4 is provided with a first lead groove 42 in communication with the outside, the connecting base 41 is provided with a first through hole 411 in communication with the first lead groove 42, the connecting rod 12 is provided with a second lead groove 121, the ceiling base 11 is provided with a second through hole 111 enabling the second lead groove 121 to be in communication with the ceiling base 11, an end, close to the lamp holder 13, of the connecting rod 12 is provided with a third through hole 122 enabling the second lead groove 121 to be in communication with the outside, and a controller 6 capable of controlling the stage lamp 5, the light-emitting assembly 3, and the fan assembly 2 to operate is arranged in the ceiling base 11. In this way, a power line and a data line of the stage lamp 5 can pass through the first lead groove 42 and the second lead groove 121 to be connected to the controller 6, and a power line and a data line of the light-emitting assembly 3 can pass through the second lead groove 121 to be connected to the controller 6, so as to facilitate control of the stage lamp 5, the light-emitting assembly 3, and the fan assembly 2 by means of the single controller 6, simplifying the structure. This allows a user to easily adjust the light color, brightness, fan speed and other parameters through a remote control or cell phone APP, etc. The operation is simple and convenient, which improves the user experience.

With reference to FIG. 1 to FIG. 7, in an embodiment of the solution, the connecting component 4 includes a number of L-shaped rods 43 connected to the connecting base 41, a number of round rods 44 connected to the L-shaped rods 43 and connecting and fixing the number of L-shaped rods 43, and a number of fixing plates 45 arranged on the round rods 44, with the other ends fixed to an upper end of the lamp holder 13, where one end of the fixing plate 45 is fixed to the uppermost round rod 44 by means of welding, and the other end thereof is connected to the lamp holder 13 by means of threaded connection, so as to fix a connecting bracket to the lamp holder 13. In addition, by matching of the L-shaped rods 43 with the round rods 44, not only can the stability of supporting rods be ensured, but the influences on airflow during the rotation of the fan assembly 2 can also be reduced. Further, the L-shaped rod 43 is internally hollow to form the first lead groove 42, and an end, away from the first through hole 411, of the first lead groove 42 is located below the third through hole 122.

With reference to FIG. 8 to FIG. 11, in an embodiment of the solution, the connecting component 4 includes a cover plate 46 detachably arranged on the lamp holder 13, where the cover plate 46 and the lamp holder 13 are detachably connected by means of threaded connection or snap-fit engagement, and the cover plate 46 is provided with a number of ventilation holes 47, by which structure the aesthetics of the product are also enhanced, making the product more in line with the aesthetic needs of modern homes. Further, the first lead groove 42 extends from an inside of the cover plate 46 to an outside of the cover plate 46, and an end, away from the first through hole 411, of the first lead groove 42 is located below the third through hole 122.

Figure 12:
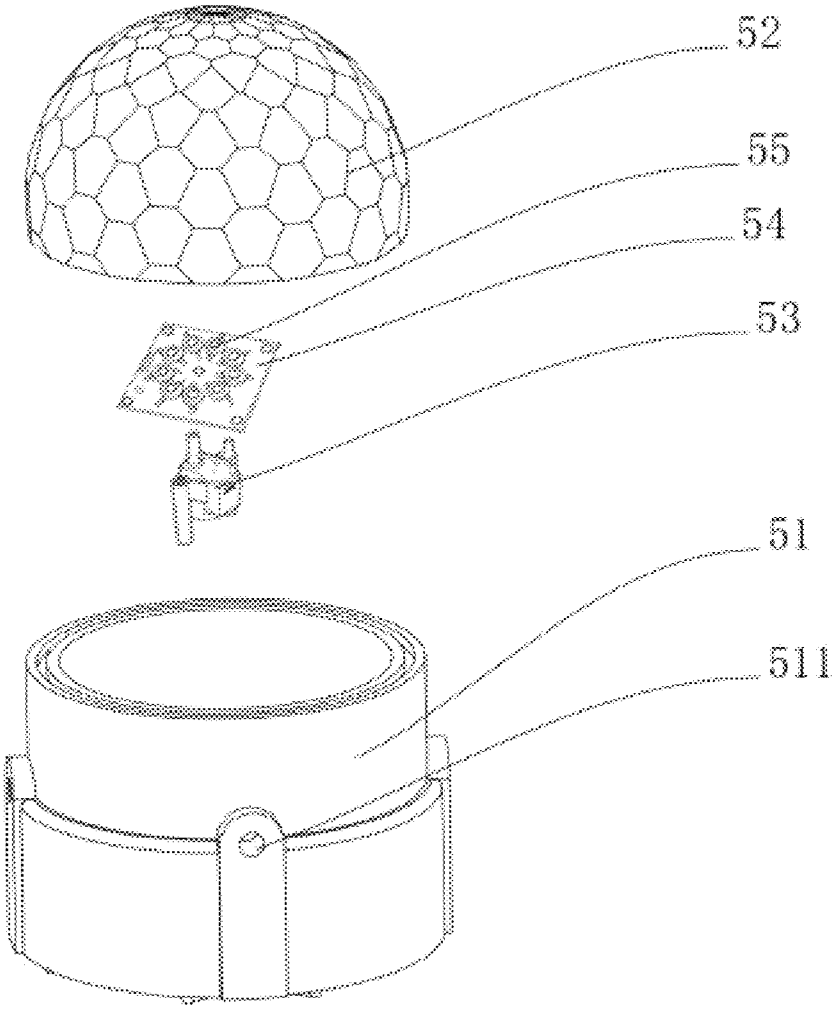
FIG. 12 is a schematic exploded view of a stage lamp in the present disclosure.

With reference to FIG. 12, in the solution, the stage lamp 5 includes a housing 51 arranged on the connecting base 41, a lampshade 52 covering the housing 51, a driving motor 53 arranged in the housing 51, a lamp plate 54 arranged on an output shaft of the driving motor 53, and a number of lamp beads 55 arranged on the lamp plate 54. The lampshade 52 is hemispherical and fixed to the housing 51 by means of snap fit or bonding, and the lamp plate 54 is arranged on an output shaft of the driving motor 53 in a snap-fit sleeving mode, so that the driving motor 53 can drive the lamp plate 54 to rotate, while the lamp beads 55 on the lamp plate 54 emit colorful light, thereby realizing a dazzling and colorful lighting effect.

In the solution, the connecting base 41 includes a mounting groove 412 for assembling the housing 51, the mounting groove 412 is detachably connected to the housing 51 by means of threaded connection or snap-fit engagement, so as to mount the stage lamp 5 on the connecting base 41.

In the solution, the housing 51 is provided with a fourth through hole 511 in communication with the first through hole 411, so as to facilitate the power line and the data line in the housing 51 to pass through the fourth through hole 511 and then be connected into the first lead groove 42 through the first through hole 411.

In the solution, the lamp holder 13 is provided with a lamp groove 131, and a fifth through hole 132 in communication with the second lead groove 121 is formed in the lamp groove 131, so as to facilitate connecting the power line and the data line of the light-emitting assembly 3 into the second lead groove 121 through the fifth through hole 132. The light-emitting assembly 3 includes a light strip 31 arranged in the light groove 131 and a light-transmitting component 32 covering the light groove 131, where the light-transmitting component 32 may be a light-transmitting plate or a light-transmitting cover covering the light groove 131. The fan assembly 2 includes a driving member arranged at a bottom of the ceiling base 11, and fan blades arranged on an output shaft of the driving member.

In summary, the user can control the controller 6 by means of a remote control, so as to select different lighting modes of the stage lamp 5, such as a static color mode and a dynamic rotating mode; at the same time, the brightness and color of the light-emitting assembly 3 can be adjusted; and the rotational speed of the fan assembly 2 can be adjusted according to the needs to achieve the function of air circulation.

What is claimed is:

1. A colorfully dazzling fan lamp, comprising a main body frame (1), a fan assembly (2) connected to the main body frame (1), and a light-emitting assembly (3) arranged on the main body frame (1), wherein a bottom of the main body frame (1) is provided with a connecting component (4), a stage lamp (5) located below the fan assembly (2) is connected to the connecting component (4), and the connecting component (4) is provided with a connecting base (41) for assembling the stage lamp (5);

wherein the main body frame (1) comprises a ceiling base (11), a connecting rod (12), and a lamp holder (13) arranged in sequence from top to bottom, the connecting component (4) is provided with a first lead groove (42) in communication with the outside, the connecting base (41) is provided with a first through hole (411) in communication with the first lead groove (42), the connecting rod (12) is provided with a second lead groove (121), the ceiling base (11) is provided with a second through hole (111) enabling the second lead groove (121) to be in communication with the ceiling base (11), an end, close to the lamp holder (13), of the connecting rod (12) is provided with a third through hole (122) enabling the second lead groove (121) to be in communication with the outside, and a controller (6) capable of controlling the stage lamp (5), the light-emitting assembly (3), and the fan assembly (2) to operate is arranged in the ceiling base (11).

2. The colorfully dazzling fan lamp according to claim 1, wherein the connecting component (4) comprises a number of L-shaped rods (43) connected to the connecting base (41), a number of round rods (44) connected to L-shaped rods (43) and connecting and fixing the number of L-shaped rods (43), and a number of fixing plates (45) arranged on the round rods (44), with the other ends fixed to an upper end of the lamp holder (13).

3. The colorfully dazzling fan lamp according to claim 2, wherein the L-shaped rod (43) is internally hollow to form the first lead groove (42), and an end, away from the first through hole (411), of the first lead groove (42) is located below the third through hole (122).

4. The colorfully dazzling fan lamp according to claim 1, wherein the connecting component (4) comprises a cover plate (46) detachably arranged on the lamp holder (13), and the cover plate (46) is provided with a number of ventilation holes (47).

5. The colorfully dazzling fan lamp according to claim 4, wherein the first lead groove (42) is formed in the cover plate (46), the first lead groove (42) extends from an inside of the cover plate (46) to an outside of the cover plate (46), and an end, away from the first through hole (411), of the first lead groove (42) is located below the third through hole (122).

6. The colorfully dazzling fan lamp according to claim 1, wherein the stage lamp (5) comprises a housing (51) arranged on the connecting base (41), a lampshade (52) covering the housing (51), a driving motor (53) arranged in the housing (51), a lamp plate (54) arranged on the driving motor (53), and a number of lamp beads (55) arranged on the lamp plate (54).

7. The colorfully dazzling fan lamp according to claim 6, wherein the connecting base (41) comprises a mounting groove (412) detachably connected to the housing (51).

8. The colorfully dazzling fan lamp according to claim 6, wherein the housing (51) is provided with a fourth through hole (511) in communication with the first through hole (411).

9. The colorfully dazzling fan lamp according to claim 1, wherein the lamp holder (13) is provided with a lamp groove (131), a fifth through hole (132) in communication with the second lead groove (121) is formed in the lamp groove (131), and the light-emitting assembly (3) comprises a lamp strip (31) arranged in the lamp groove (131) and a light-transmitting component (32) covering the lamp groove (131).

* * * * *